United States Patent
Janssen et al.

(10) Patent No.: US 9,540,574 B2
(45) Date of Patent: *Jan. 10, 2017

(54) PROCESS FOR PRODUCING AND SEPARATING OIL

(71) Applicant: Shell Oil Company, Houston, TX (US)

(72) Inventors: Albert Joseph Hendrik Janssen, Rijswijk (NL); Bartholomeus Marinus Josephus Maria Suijkerbuijk, Utrecht (NL)

(73) Assignee: SHELL OIL COMPANY, Houston, TX (US)

(*) Notice: Subject to any disclaimer, the term of this patent is extended or adjusted under 35 U.S.C. 154(b) by 691 days.

This patent is subject to a terminal disclaimer.

(21) Appl. No.: 13/961,366

(22) Filed: Aug. 7, 2013

(65) Prior Publication Data
US 2014/0042058 A1    Feb. 13, 2014

Related U.S. Application Data

(60) Provisional application No. 61/681,232, filed on Aug. 9, 2012.

(51) Int. Cl.
*E21B 43/20* (2006.01)
*C10G 53/04* (2006.01)
(Continued)

(52) U.S. Cl.
CPC .............. *C10G 53/04* (2013.01); *C09K 8/035* (2013.01); *C10G 1/047* (2013.01); *C10G 33/04* (2013.01);
(Continued)

(58) Field of Classification Search
CPC ........ E21B 43/385; E21B 43/40; E21B 43/14; E21B 43/17; E21B 43/20; B01D 17/0214; B01D 17/04; B01D 19/00; B01D 17/085; B01D 2256/245; B01D 61/025; B01D 61/027; B01D 61/08; B01D 61/58; B01D 63/00; B01D 2311/2649; B01D 2311/2653; B01D 2317/02; B01D 2317/04; B01D 2317/08
See application file for complete search history.

(56) References Cited

U.S. PATENT DOCUMENTS

1,747,119 A * 2/1930 Lerch ..................... C10G 33/04
516/157
3,353,593 A  11/1967 Boberg
(Continued)

FOREIGN PATENT DOCUMENTS

WO    WO0212675       2/2002
WO    WO2004106697    12/2004
(Continued)

OTHER PUBLICATIONS

Webb K. et al: Low Salinity Oil Recovery-Log-Inject-Log, Soc. Petrol. Eng., SPE 89379, 2004.
(Continued)

*Primary Examiner* — Doug Hutton, Jr.
*Assistant Examiner* — Charles R Nold

(57) ABSTRACT

The present invention is directed to a process for producing and separating oil. An aqueous fluid having an ionic content of at most 0.15 M and a total dissolved solids content of from 200 ppm to 10,000 ppm is introduced into an oil-bearing formation. Oil and water are produced from the formation subsequent to the introduction of the aqueous fluid into the formation. A demulsifier and a brine solution having a total dissolved solids content of greater than 10,000 ppm are mixed with the oil and water produced from the formation. Oil is then separated from the mixture of oil, water, demulsifier, and brine solution.

14 Claims, 7 Drawing Sheets

(51) Int. Cl.
*C10G 33/04* (2006.01)
*C10G 1/04* (2006.01)
*C09K 8/035* (2006.01)
*E21B 43/34* (2006.01)

(52) U.S. Cl.
CPC ............... *E21B 43/20* (2013.01); *E21B 43/34* (2013.01); *C10G 2300/1033* (2013.01); *C10G 2300/208* (2013.01)

(56) References Cited

U.S. PATENT DOCUMENTS

| | | | |
|---|---|---|---|
| 3,410,345 A | 11/1968 | Fradklin et al. | |
| 4,029,570 A * | 6/1977 | Coffman | C10G 33/04 166/267 |
| 4,036,300 A | 7/1977 | Holm et al. | |
| 4,277,352 A | 7/1981 | Allison et al. | |
| 4,723,603 A | 2/1988 | Plummer | |
| 4,969,520 A | 11/1990 | Jan et al. | |
| 5,507,958 A * | 4/1996 | White-Stevens | B01D 17/02 208/187 |
| 5,855,243 A | 1/1999 | Bragg | |
| 6,491,824 B1 * | 12/2002 | Lin | B01D 17/00 210/666 |
| 6,955,222 B2 * | 10/2005 | Lien | B01D 61/027 166/275 |
| 7,726,398 B2 * | 6/2010 | Collins | E21B 43/20 166/266 |
| 7,987,907 B2 * | 8/2011 | Collins | C09K 8/58 166/252.1 |
| 2002/0162806 A1 * | 11/2002 | Komistek | B01D 17/00 210/788 |
| 2007/0095759 A1 | 5/2007 | Bridle | |
| 2007/0102359 A1 * | 5/2007 | Lombardi | B01D 17/085 210/639 |
| 2008/0070813 A1 | 3/2008 | Lin et al. | |
| 2009/0020467 A1 * | 1/2009 | Parkinson | B01D 17/0217 210/188 |
| 2011/0100402 A1 | 5/2011 | Soane et al. | |
| 2011/0186515 A1 * | 8/2011 | Guimaraes | B01D 17/04 210/643 |
| 2011/0240524 A1 * | 10/2011 | Fenton | B01D 17/042 208/188 |
| 2011/0247823 A1 | 10/2011 | Dams et al. | |
| 2012/0055668 A1 | 3/2012 | Wu et al. | |
| 2012/0090833 A1 | 4/2012 | Ligthelm | |
| 2014/0008271 A1 * | 1/2014 | Moene | B01D 17/0214 208/188 |

FOREIGN PATENT DOCUMENTS

| | | |
|---|---|---|
| WO | WO2006120399 | 11/2006 |
| WO | WO2007138327 | * 6/2007 |
| WO | WO2010080657 | 7/2010 |
| WO | WO2010092097 | 8/2010 |
| WO | 2011092095 | 8/2011 |

OTHER PUBLICATIONS

Webb K. et al: A Laboratory Study Investigating Methods for Improving Oil Recovery in Carbonates, International Petrol. Tech. Conference, IPTC 10506,(2005.
Robertson E. et al: European Symposium on Improved Oil Recovery, (2009); Improved Waterflooding through Injection-Brine Modification, INEEL/EXT-02-01591, 2003.
Loahardjo N. et al: Low Salinity Waterflooding of a Reservoir Rock, SCA2007-29 (International Symposium of the Society of Core Analysts, Calgary (Sep. 2007), 2007.
Thyne G. et al: Evaluation of Low-Salinity Waterflooding for 51 Fields in Wyoming, SCA2011-56 (International Symposium of the Society of Core Analysts, Austin, TX (Sep. 2011), 2011.
Morrow N. et al: Improved Oil Recovery by Low-Salinity Waterflooding, SPE-129421-JPT, pp. 106-110, May 2011.
Robertson E. Low-Salinity Waterflooding to Improve Oil Recovery-Historical Field Evidence, SPE 109965, 2007.
Jerauld G. et al: Modeling Low-Salinity Waterflooding, SPE Reservoir Evaluation & Eng. XP-002540307, 2008.
Webb K., et al: Low Salinity Oil Recovery-Log-Inject-Log, SPE 81460 (2003); RIVET S.: Coreflooding Oil Displacements with Low Salinity Brine, Thesis-University of Texas, 2009.
Lager A. et al: Low Salinity Oil Recovery-An Expermental Investigation, SCA2006-36 (International Symposium of the Society of Core Analysts (Trondheim, Norway Sep. 2006), 2006.
Ayirala S. et al: A Designer Water Process for Offshore Low Salinity and Polymer Flooding Applications, SPE 129926, 2010.
Wang X. et al: Effects of Aqueous-Phase Salinity on Water-in-Crude Emulsion Stability, J. of Dispersion Sci. and Tech., 33:2, 165-170.
Kokal S. : Chapter 12—Crude Oil Emulsions, Pet. Eng. Handbook-vol. 1, 2012.

* cited by examiner

FIG. 4

PROCESS FOR PRODUCING AND SEPARATING OIL

This present application claims the benefit of U.S. Patent Application No. 61/681,232, filed Aug. 9, 2012.

FIELD OF THE INVENTION

The present invention is directed to a process for producing hydrocarbons from a hydrocarbon-bearing formation. In particular, the present invention is directed to a process for producing hydrocarbons and water from a hydrocarbon-bearing formation and separating the hydrocarbons from the water.

BACKGROUND OF THE INVENTION

Only a portion of oil present in an oil-bearing formation is recoverable as a result of the natural pressure of the formation. The oil recovered from this "primary" recovery typically ranges from 5% to 35% of the oil in the formation. Enhanced oil recovery methods have been developed to increase the amount of oil that may be recovered from an oil-bearing formation above and beyond that recovered in primary recovery.

Water-flooding, in which water is injected through an injection well into an oil-bearing formation to mobilize and drive oil through the formation for production from a production well, is a widely used method of secondary recovery used to increase the amount of oil recovered from a formation beyond primary recovery. Recently, water-flooding utilizing water having low salinity has been utilized to increase the amount of oil recovered from a formation relative to the amount of oil recovered in a conventional higher salinity water-flood. Low salinity water may be used in place of higher salinity water conventionally used in a water-flood in a secondary recovery, or low salinity water may be used after a conventional higher salinity water-flood to incrementally increase oil recovery over that of the initial water-flood in a tertiary recovery process.

Low salinity water utilized in low salinity water-flooding has a lower ionic strength than connate water present in the formation, typically having an ionic strength of 0.15 M or less and having a total dissolved solids ("TDS") content of from 200 parts per million ("ppm") to 10,000 ppm and a multivalent cation content that is less than the multivalent cation content of the connate water. Injection of low salinity water into a formation may reduce the ionic bonding of oil to the formation within pores in the formation by double layer expansion, leading to a reduction in the rock's adsorption capacity for hydrocarbons. This increases the mobility of the oil in the formation by making the surface of the pores of the formation more water-wet and less oil-wet, permitting the mobile oil to be removed from the pores in which it resides and to be driven to a production well for production from the formation.

In an enhanced oil recovery process utilizing water-flooding, oil and water, and typically gas as well, are produced from the formation together. The oil, water, and gas are separated in a separator to recover the oil from the produced water and gas. Free water is separated and removed from the oil by phase separation. At least a portion of the oil and a portion of the water, however, may be intimately mixed in an emulsion. The emulsion may be treated in a coalescer that helps break the emulsion by causing water in the emulsion (in a water-in-oil emulsion) or oil in the emulsion (in a oil-in-water emulsion) to coalesce and phase separate. The separated phases may then be recovered separately.

Improved processes for separating oil and water produced from an oil-bearing formation by a low salinity water-flood enhanced oil recovery process are desirable.

SUMMARY OF THE INVENTION

In one aspect, the present invention is directed to a process for producing oil from an oil-bearing formation, comprising:

introducing an aqueous fluid having an ionic strength of at most 0.15 mol/l and total dissolved solids content of from 200 ppm to 10,000 ppm into the oil-bearing formation;

producing oil and water from the formation after introducing the aqueous fluid into the formation;

mixing a brine solution having a total dissolved solids content of at least 10,000 ppm and a demulsifier with oil and water produced from the formation; and separating oil from the mixture of oil, water, brine solution and demulsifier.

In another aspect, the present invention is directed to a process for separating oil and water produced from an oil-bearing formation into which an aqueous fluid having an ionic concentration of at most 0.15 M and a total dissolved solids content of from 200 ppm to 10,000 ppm has been introduced comprising the steps of:

mixing a brine solution having a total dissolved solids content of greater than 10,000 ppm and a demulsifier with at least a portion of the oil and water produced from the formation; and separating oil from the mixture of oil, water, demulsifier and brine solution.

In a further aspect, the present invention is directed to a process for producing oil, comprising introducing an aqueous fluid having an ionic strength of at most 0.15 M and a total dissolved solids content of from 200 ppm to 10,000 ppm into an oil-bearing formation;

producing oil and water from the formation via a producing well subsequent to the introduction of the aqueous fluid into the formation;

introducing a demulsifier into the oil and water produced from the formation at or within the producing well to form a mixture of produced oil, produced water, and demulsifier;

mixing a brine solution having a total dissolved solids content of greater than 10,000 ppm with at least a portion of the mixture of produced oil, produced water, and demulsifier; and separating oil from the mixture of oil, water, demulsifier, and brine solution.

BRIEF DESCRIPTION OF THE DRAWINGS

FIG. 4 is a diagram of an oil-production and separation system that may be used in the process of the present invention.

DETAILED DESCRIPTION OF THE INVENTION

Figure 1:
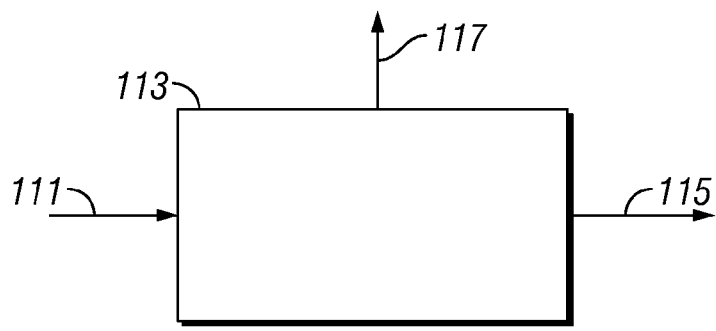
FIG. 1 is a diagram of an ionic filter that may be used in the process of the present invention.

It has been discovered that, when utilizing a low salinity water-flood enhanced oil recovery process, a problem arises in separating produced oil from water that is produced along with the oil. In particular, it has been discovered that at least a portion of the oil and water produced from an oil-bearing formation form a tight emulsion when employing a low salinity water-flood enhanced oil recovery process. The tight emulsion is significantly more difficult to break and separate than oil/water emulsions formed using conventional, higher salinity water-floods.

The present invention is directed to recognition of that problem and application of a process to reduce or eliminate the tight oil/water emulsion. In one aspect, the present invention is directed to a process in which a brine solution and a demulsifier are mixed with a tight emulsion of oil and water to increase the salinity of the oil/water mixture to loosen the oil-water emulsion so that the oil and water may be more easily separated. The oil and water are then separated and recovered. The tight emulsion of oil and water may be produced from an oil-bearing formation in which a low salinity water-flood enhanced oil recovery is utilized In another aspect, the present invention is directed to a process in which a low salinity aqueous fluid is introduced into an oil-bearing formation, where the low salinity aqueous fluid has an ionic strength of at most 0.15 M and a total dissolved solids content of from 200 ppm to 10,000 ppm. Oil and water are produced from the formation subsequent to the introduction of the low salinity aqueous fluid into the formation. A brine solution having a total dissolved solids content of at least 10,000 ppm is mixed with at least a portion of the oil and water produced from the formation to enhance separation of the water and the oil, and then oil is separated from the mixture of oil, water, and brine solution.

In another aspect, the present invention is directed to process in which a low salinity aqueous fluid is introduced into an oil-bearing formation, where the low salinity aqueous fluid has an ionic strength of at most 0.15 M and a total dissolved solids content of from 200 ppm to 10000 ppm; oil and water are produced from the formation via a producing well subsequent to the introduction of the low salinity aqueous fluid into the formation; and a demulsifier is introduced into the oil and water produced from the formation at or within the producing well to form a mixture of produced oil, produced water, and demulsifier. A brine solution having a total dissolved solids content of greater than 10,000 ppm is mixed with at least a portion of the mixture of produced oil, produced water, and demulsifier to enhance separation of the water and the oil, and the oil is separated from the mixture of produced oil, produced water, demulsifier, and brine solution.

The low salinity aqueous fluid provided for introduction into the oil-bearing formation has a TDS content of from 200 ppm to 10,000 ppm and has an ionic strength of at most 0.15 M. The low salinity aqueous fluid may have a TDS content of from 500 ppm to 7,000 ppm, or from 1000 ppm to 5,000 ppm, or from 1,500 ppm to 4,500 ppm. The low salinity aqueous fluid may have an ionic strength of at most 0.1 M or at most 0.05 M, or at most 0.01 M, and may have an ionic strength of from 0.01 M to 0.15 M, or from 0.02 M to 0.125 M, or from 0.03 M to 0.1 M. Ionic strength, as used herein, is defined by the equation $$I = \frac{1}{2} * \sum_{i=1}^{n} c_i z_i^2$$

where I is the ionic strength, c is the molar concentration of ion i, z is the valency of ion i, and n is the number of ions in the measured solution.

The low salinity aqueous fluid may have an ionic strength that is less than the ionic strength of connate water present in the oil-bearing formation, and/or a multivalent cation concentration that is less than the multivalent cation concentration of connate water present in the oil-bearing formation, and/or a divalent cation concentration that is less than the divalent cation concentration of connate water present in the oil-bearing formation. The fraction of the ionic strength of the low salinity aqueous fluid to the ionic strength of the connate water may be less than 1, or may be less than 0.9, or may be less than 0.5, or may be less than 0.1, or may be from 0.01 up to, but not including, 1, or from 0.05 to 0.9, or from 0.1 to 0.8. The fraction of the multivalent cation content of the low salinity aqueous fluid to the multivalent cation content of the connate water may be less than 1, or may be less than 0.9, or may be less than 0.5, or may be less than 0.1, or may be from 0.01 up to, but not including, 1, or from 0.05 to 0.9, or from 0.1 to 0.8. The fraction of the divalent ion content of the low salinity aqueous fluid to the divalent ion content of the connate water may be less than 1, or less than 0.9, or less than 0.5, or less than 0.1, or from 0.01 up to, but not including, 1, or from 0.05 to 0.9, or from 0.1 to 0.8.

The low salinity aqueous fluid may have a relatively low multivalent cation content and/or a relatively low divalent cation content. The low salinity aqueous fluid may have a multivalent cation concentration of at most 200 ppm, or at most 100 ppm, or at most 75 ppm, or at most 50 ppm, or at most 25 ppm, or from 1 ppm to 200 ppm, or from 2 ppm to 100 ppm, or from 3 ppm to 75 ppm, or from 4 ppm to 50 ppm, or from 5 ppm to 25 ppm. The low salinity aqueous fluid may have a divalent cation concentration of at most 150 ppm, or at most 100 ppm, or at most 75 ppm, or at most 50 ppm, or at most 25 ppm, or from 1 ppm to 100 ppm, or from 2 ppm to 75 ppm, or from 3 ppm to 50 ppm, or from 4 ppm to 25 ppm, or from 5 ppm to 20 ppm.

The low salinity aqueous fluid may be provided from a natural source. The low salinity aqueous fluid may be provided from a natural source such as an aquifer, a lake, water produced from the oil-bearing formation, or a river comprising water containing from 200 ppm to 10,000 ppm total dissolved solids. The low salinity aqueous fluid may be provided by processing water from a natural source such as an aquifer, a lake, water produced from the oil-bearing formation, or a river wherein the water from the natural source has a TDS content of from 0 ppm to 200 ppm and wherein the TDS content of the water may be adjusted to 200 ppm to 10,000 ppm by adding one or more salts, for example NaCl and/or $CaCl_2$, to the water.

Alternatively, the low salinity aqueous fluid, or at least a portion thereof, may be provided by processing a saline source water to produce the low salinity aqueous fluid. The saline source water to be processed may have a TDS content of greater than 10,000 ppm if the low salinity aqueous fluid produced by processing the saline source water is to have a TDS content of from 200 ppm to 10000 ppm, or the saline source water may have a TDS content of greater than 5000 ppm if the low salinity aqueous fluid produced by processing the saline source water is to have a TDS content of from 200 ppm to 5000 ppm. The saline source water to be processed may have a TDS content of at least 5000 ppm, or at least 10,000 ppm, or at least 15,000 ppm, or at least 17,500 ppm, or at least 20,000 ppm, or at least 25,000 ppm, or at least 30,000 ppm, or at least 40,000 ppm, or at least 50,000 ppm, or from 10,000 ppm to 250,000 ppm, or from 15,000 ppm to 200,000 ppm, or from 17,500 ppm to 150,000 ppm, or from 20,000 ppm to 100,000 ppm, or from 25,000 ppm to 50,000 ppm. The saline source water to be processed may be selected from the group consisting of aquifer water, seawater, brackish water, water produced from the oil-bearing formation, water from a mixture of oil, water, and a brine solution formed in separating produced oil from produced water subsequent to separation of oil from the mixture as described below, and mixtures thereof.

Referring now to FIG. 1, a saline source water having a TDS content of greater than 10,000 ppm or having a TDS content of greater than 5,000 ppm, as described above may be processed to produce at least a portion of the low salinity aqueous fluid for introduction into the oil-bearing formation by contacting the saline source water 111 with an ionic filter 113. A portion of the source water 111 may be passed through the ionic filter 113 to form treated water 115 having reduced salinity relative to the source water 111, wherein the treated water may have a TDS content of less than 10,000 ppm, and more preferably of from 200 ppm to 10,000 ppm, and most preferably from 200 ppm to 5,000 ppm. At least a portion of the treated water 115 may be utilized as at least a portion of the low salinity aqueous fluid that is introduced into the oil-bearing formation.

A portion of the source water may be excluded from passing through the ionic filter 113 to form a retentate 117 having increased salinity relative to the source water. The retentate may have a TDS content of at least 15,000 ppm, or from 15,000 ppm to 250,000 ppm. At least a portion of the retentate 117 may be used as at least a portion of the brine solution utilized to separate produced oil and water, as described in further detail below.

If the permeate has a TDS content of less than 200 ppm, the permeate may be treated to adjust the TDS content to a range of from 200 ppm to 5,000 ppm. A portion of the retentate 117 may be added to the permeate to adjust the TDS content to a range of from 200 ppm to 5,000 ppm.

The ionic filter 113 may be a membrane based system utilizing ionic separation membrane units selected from the group consisting of a nanofiltration membrane unit, a reverse osmosis membrane unit, and combinations thereof. A nanofiltration membrane unit may be comprised of one or more nanofiltration membranes effective for preferentially or selectively removing multivalent ions, including divalent ions, from the source water so the treated water may contain less than 80%, or less the 90%, or less than 95% multivalent ions than the source water fed to the nanofiltration membrane(s), and the retentate may contain a corresponding increase of multivalent ions relative to the source water. The one or more nanofiltration membranes of a nanofiltration membrane unit may also moderately reduce the monovalent ion content of source water fed to the nanofiltration membrane(s), where the treated water may contain less than 20%, or less than 30%, or less than 50%, or less than 70% of monovalent ions than the source water fed to the nanofiltration membrane(s), and the retentate may contain a corresponding increase of monovalent ions relative to the source water. Nanofiltration membranes may be formed of charged polymeric materials (e.g. having carboxylic acid, sulfonic acid, amine, or amide functional groups) including polyamides, cellulose acetate, piperazine, or substituted piperazine membranes in which a thin ion discriminating layer of membrane is supported on a thicker porous material, which is sandwiched between the discriminating layer and a backing material. Suitable commercially available nanofiltration membranes in sheet form or in spirally wound form that may be utilized in a nanofiltration membrane unit in the ionic filter 13 include, but are not limited to, SEASOFT 8040DK, 8040DL, and SEASAL DS-5 available from GE Osmonics, Inc., 5951 Clearwater Drive, Minnetonka, Minn. 55343, United States; NF200 Series, and NF-55, NF-70, and NF-90 available from Dow FilmTec Corp., 5239 W. $73^{rd}$ St., Minneapolis, Minn., 55345, United States; DS-5 and DS-51 available from Desalination Systems, Inc., 760 Shadowridge Dr., Vista, Calif., 92083, United States; ESNA-400 available from Hydranautics, 401 Jones Road, Oceanside, Calif. 92508, United States; and TFCS available from Fluid Systems, Inc., 16619 Aldine Westfield Road, Houston, Tex. 77032, United States.

A reverse osmosis membrane unit useful in the ionic filter 113 may be comprised of one or more reverse osmosis membranes effective for removing substantially all ions, including monovalent ions, from the source water so the treated water may contain less than 85%, or less than 90%, or less than 95%, or less than 98% ions than the source water fed to the reverse osmosis membrane(s), and the retentate may contain a corresponding increase of ions relative to the source water. Reverse osmosis membranes may be spirally wound or hollow fiber modules, and may be asymmetric membranes prepared from a single polymeric material, such as asymmetric cellulose acetate membranes, or thin-film composite membranes prepared from a first and a second polymeric material, such as cross-linked aromatic polyamides in combination with a polysulfone. Suitable commercially available reverse osmosis membranes that may be utilized in a reverse osmosis membrane unit in the ionic filter 113 include, but are not limited to, AG8040F and AG8040-400 available from GE Osmonics; SW30 Series and LF available from Dow FilmTec Corp.; DESAL-11 available from Desalination Systems, Inc.; ESPA available from Hydranautics; ULP available from Fluid Systems, Inc.; and ACM available from TriSep Corp., 93 S. La Patera Lane, Goleta, Calif. 93117, United States.

Typically, pressure must be applied across the ionic filter 113 to overcome osmotic pressure across the membrane when saline source water 111 is filtered to reduce the TDS content of the source water and produce the treated water 115. The pressure applied across the ionic filter 113 may be at least 2.0 MPa, or at least 3.0 MPa, or at least 4.0 MPa, and may be at most 10.0 MPa, or at most 9.0 MPa, or at most 8.0 MPa, and may range from 2.0 MPa to 10.0 MPa, or from 3.0 MPa to 9.0 MPa. The pressure applied across a nanofiltration membrane in the ionic filter 113 may be in the lower portion of the pressure range relative to the pressure applied across a reverse osmosis membrane. The pressure applied across a nanofiltration membrane unit of the ionic filter 113 may range from 2.0 MPa to 6.0 MPa, and the pressure applied across a reverse osmosis membrane unit of the ionic filter 113 may range from 4.0 MPa to 10.0 MPa. If the ionic filter 113 is comprised of membrane units—either nanofiltration, reverse osmosis, or both—combined in a series, the pressure applied across each membrane of the membrane unit may be less than the previous membrane unit by at least 0.5 MPa as less pressure is required to overcome the osmotic pressure of the permeate of a preceding membrane unit.

Figure 2:
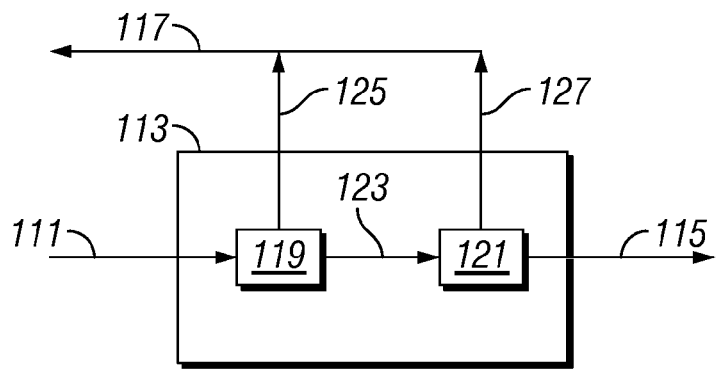
FIG. 2 is a diagram of an ionic filter that may be used in the process of the present invention.

Referring now to FIG. 2, the ionic filter 113 may be comprised of a first ionic membrane unit 119 and one or more second ionic membrane units 121 arranged in series, wherein each ionic membrane unit may be a nanofiltration membrane unit or a reverse osmosis membrane unit. The saline source water 111 having a TDS content of greater than 10,000 ppm or greater than 5,000 ppm as described above may be contacted with the first ionic membrane unit 119 to pass at least a portion of the saline source water through the first ionic membrane unit to form a permeate 123 having a reduced TDS content relative to the saline source water, wherein the permeate may have a TDS content of at least 1,000 ppm, or at least 2,500 ppm, or at least 5,000 ppm, or at least 7,000 ppm, or at least 10,000 ppm. A portion of the saline source water may be excluded from passing through the first ionic membrane unit 119 to form a primary retentate 125 having increased salinity relative to the source water. The permeate 123 may be contacted with each of the second ionic membrane units 121 in sequence to pass at least a portion of the permeate through each of the second ionic membrane units to form treated water 115 having reduced salinity relative to the permeate and the saline source water, wherein the treated water may have a TDS content of less than 10,000 ppm, and preferably from 200 ppm to 5,000 ppm. At least a portion of the treated water 115 may be utilized as at least a portion of the low salinity aqueous fluid that is introduced into the oil-bearing formation.

A portion of the permeate 123 may be excluded from passing through each of the one or more second ionic membrane units 121 to form one or more secondary retentates 127. The primary retentate 125, one or more of the secondary retentates 127, or a combination of the primary retentate 125 and one or more of the secondary retentates 127 may be utilized as the retentate 117 from the ionic filter 113, where the retentate 117 has an increased salinity relative to the source water 111 and may have a TDS content of at least 15,000 ppm, or from 15,000 ppm to 250,000 ppm. At least a portion of the retentate 117 may be used as at least a portion of the brine solution utilized to separate produced oil and water, as described in further detail below.

If the permeate has a TDS content of less than 200 ppm, the permeate may be treated to adjust the TDS content to a range of from 200 ppm to 5,000 ppm. A portion of the primary retentate or one or more of the second retentates may be added to the permeate to adjust the TDS content to a range of from 200 ppm to 5,000 ppm.

Figure 3:
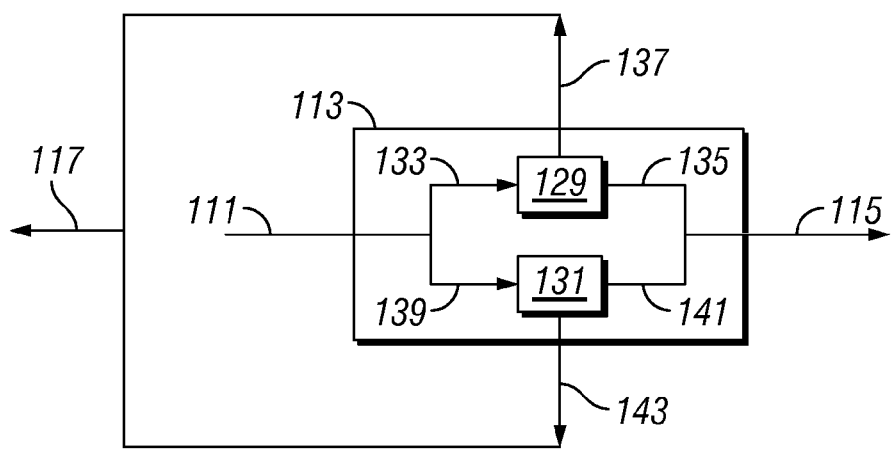
FIG. 3 is a diagram of an ionic filter that may be used in the process of the present invention.

Referring now to FIG. 3, the ionic filter 113 may be comprised of a first ionic membrane unit 129 and a second ionic membrane unit 131 arranged in parallel, wherein the first ionic membrane unit may be comprised of one or more nanofiltration membranes or one or more reverse osmosis membranes, or a combination thereof, and the second ionic membrane unit may be comprised of one or more nanofiltration membranes, one or more reverse osmosis membranes, or a combination thereof. A portion 133 of the saline source water 111 as described above may be contacted with the first ionic membrane unit 129 and a portion of the saline source water portion 133 may be passed through the first ionic membrane unit 129 to form a first permeate 135 having reduced TDS content relative to the saline source water 111. The first permeate 135 may have a TDS content of less than 10,000 ppm, or less than 7,000 ppm, or less than 5,000 ppm, or from 1,000 ppm to 5,000 ppm. A portion of the saline source water portion 133 may be excluded from passing through the first ionic membrane unit 129 to form a first retentate 137 having a TDS content greater than the saline source water 111. The first retentate 137 may have a TDS content of at least 15,000 ppm, or at least 20000 ppm, or at least 25,000 ppm, or at least 30,000 ppm, or at least 40,000 ppm, or at least 50,000 ppm. A separate portion 139 of the saline source water 111 may be contacted with the second ionic membrane unit 131, and a portion of the saline source water portion 139 may be passed through the second ionic membrane unit 131 to form a second permeate 141 having reduced TDS content relative to the saline source water 111. The second permeate may have a TDS content of less than 10,000 ppm, or less than 7,000 ppm, or less than 5,000 ppm, or from 200 ppm to 5,000 ppm. A portion of the saline source water portion 139 may be excluded from passing through the second ionic membrane unit 131 to form a second retentate 143 having a TDS content of at least 15,000 ppm, or at least 20,000 ppm, or at least 25,000 ppm, or at least 30,000 ppm, or at least 40,000 ppm, or at least 50,000 ppm. At least a portion of the first and second permeates 135 and 141 may be combined to form the treated water 115 having a TDS content of less than 10,000 ppm, or less than 7,000 ppm, or less than 5,000 ppm, or from 200 ppm to 10,000 ppm, or from 500 ppm to 5,000 ppm, where at least a portion of the treated water 115 may be used as the low salinity aqueous fluid introduced into the oil-bearing formation. The first retentate 137, a portion thereof, the second retentate 143, a portion thereof, a combination of the first retentate 137 and the second retentate 143, or a combination of portions thereof, may be utilized as at least a portion of the brine solution utilized to separate produced oil and water, as described in further detail below.

In an embodiment, the first ionic membrane unit 129 may consist of one or more nanofiltration membranes and the second ionic membrane unit 131 may consist of one or more reverse osmosis membranes. The second permeate 141 passed through the second ionic membrane unit 131 may have a TDS content of less than 200 ppm provided the one or more reverse osmosis membranes of the second ionic membrane unit 131 remove substantially all of the total dissolved solids from the saline source water 111. The first permeate 135 passed through nanofiltration membranes may have sufficient monovalent ions therein to have a TDS content of at least 200 ppm, or at least 500 ppm, or at least 1,000 ppm, so that the combined first and second permeates have a TDS content of at least 200 ppm but less than 10,000 ppm. If the combined first and second permeates have a TDS content of less than 200 ppm, a portion of the first retentate or the second retentate may be added to the combined first and second permeates to adjust the TDS content to within a range of from 200 ppm to 5,000 ppm.

In the method of the present invention the low salinity aqueous fluid, which may be provided from a natural source or may be provided by processing source water having a TDS content of greater than 10,000 ppm or greater than 5,000 ppm as described above, may be introduced into an oil-bearing formation. The oil-bearing formation may be comprised of a porous matrix material, oil, and connate water. The oil-bearing formation comprises oil that may be separated and produced from the formation after introduction of the low salinity aqueous fluid into the formation.

The porous matrix material of the formation may be comprised of one or more porous matrix materials selected from the group consisting of a porous mineral matrix, a porous rock matrix, and a combination of a porous mineral matrix and a porous rock matrix. The formation may comprise one or more minerals having a net negative electrical surface charge leading to negative zeta potentials under formation conditions (temperature, pressure, pH, and salinity). Increasing levels of minerals having a negative zeta potential in a formation have been correlated to increased oil recovery when using a low salinity aqueous fluid as an oil recovery agent. "Formation conditions", when used in the context of zeta potential herein, are defined as the temperature and pressure of the formation and the pH and salinity of water in the formation. Formation temperatures may range from 5° C. to 275° C., or from 50° C. to 250° C.; formation pressures may range from 1 MPa to 100 MPa; pH of the water in the formation may range from 4 to 9, or from 5 to 8; and salinity of the formation water may range from a TDS content of 2000 ppm to 300000 ppm. "Zeta potential" may be calculated from electrophoretic mobility measurements in which an electrical current is passed via electrodes through an aqueous suspension consisting essentially of formation mineral colloidal particles and determining the direction and speed of the colloidal movement. The zeta potential of one or more formation minerals may range from −0.1 to −50 mV, or from −20 to −50 mV. The formation may comprise at least 0.1%, or at least 1%, or at least 10%, or at least 25%, or from 1% to 60%, or from 5% to 50%, or from 10% to 30% of at least one mineral having a negative zeta potential. X-ray diffraction measurements, surface charge titrations, and streaming potential measurements upon ground formation rock may be utilized to determine the amount of such minerals in the formation.

The rock and/or mineral porous matrix material of the formation may be comprised of sandstone and/or a carbonate selected from dolomite, limestone, and mixtures thereof—where the limestone may be microcrystalline or crystalline limestone. If the formation is comprised of a porous carbonate rock, the formation may contain little chalk or chalk may be absent from the formation since oil-bearing formations containing significant quantities of chalk may not be particularly susceptible to recovery of oil utilizing low salinity water-floods.

Minerals that may form the mineral porous matrix material having a negative zeta potential may be clays or transition metal compounds. Clays having a negative zeta potential that may form at least a portion of the mineral porous matrix material include smectite clays, smectite/illite clays, montmorillonite clays, illite clays, illite/mica clays, pyrophyllite clays, glauconite clays, and kaolinite clays. Transition metal compound minerals having a negative zeta potential that may form at least a portion of the mineral porous matrix material include carbonates and oxides, for example, iron oxide, siderite, and plagioclase feldspars.

The porous matrix material may be a consolidated matrix material in which at least a majority, and preferably substantially all, of the rock and/or mineral that forms the matrix material is consolidated such that the rock and/or mineral forms a mass in which substantially all of the rock and/or mineral is immobile when oil, the low salinity aqueous fluid, or other fluid is passed therethrough. Preferably at least 95 wt. % or at least 97 wt. %, or at least 99 wt. % of the rock and/or mineral is immobile when oil, the low salinity aqueous fluid, or other fluid is passed therethrough so that any amount of rock or mineral material dislodged by the passage of the oil, the low salinity aqueous fluid, or other fluid is insufficient to render the formation impermeable to the flow of the oil, the low salinity aqueous fluid, or other fluid through the formation. Alternatively, the porous matrix material may be an unconsolidated matrix material in which at least a majority, or substantially all, of the rock and/or mineral that forms the matrix material is unconsolidated. The formation, whether formed of a consolidated mineral matrix, an unconsolidated mineral matrix, or combination thereof may have a permeability of from 0.00001 to 15 Darcy's, or from 0.001 to 1 Darcy.

The oil-bearing formation may be a subterranean formation. The subterranean formation may be comprised of one or more porous matrix materials described above, where the porous matrix material may be located beneath an overburden at a depth ranging from 50 meters to 6,000 meters, or from 100 meters to 4,000 meters, or from 200 meters to 2,000 meters under the earth's surface. The subterranean formation may be a subsea formation.

The oil contained in the oil-bearing formation may have a viscosity under formation conditions (in particular, at temperatures within the temperature range of the formation) of at least 1 mPa·s (1 cP), or at least 10 mPa·s (10 cP), or at least 100 mPa·s (100 cP), or at least 1000 mPa·s (1000 cP). The oil contained in the oil-bearing formation may have a viscosity under formation temperature conditions of from 1 to 100,000 mPa·s (1 to 100,000 cP), or from 1 to 10,000 mPa·s (1 to 10,000 cP) or from 1 to 5,000 mPa·s (1 to 5,000 cP), or from 1 to 1,000 mPa·s (1 to 1000 cP).

Oil in the oil-bearing formation may be located in pores within the porous matrix material of the formation. The oil in the oil-bearing formation may be immobilized in the pores within the porous matrix material of the formation, for example, by capillary forces, by interaction of the oil with the pore surfaces, by the viscosity of the oil, or by interfacial tension between the oil and water in the formation.

The oil-bearing formation may also be comprised of water, which may be located in pores within the porous matrix material. The water in the formation may be connate water, water from a secondary or tertiary oil recovery process water-flood, or a mixture thereof. Connate water in the oil-bearing formation may have a TDS content of at least 500 ppm, or at least 1,000 ppm, or at least 2,500 ppm, or at least 5,000 ppm, or at least 10,000 ppm, or at least 25,000 ppm, or from 500 ppm to 250,000 ppm, or from 1,000 ppm to 200,000 ppm, or from 2,000 ppm to 100,000 ppm, or from 2,500 ppm to 50,000 ppm, or from 5,000 ppm to 45,000 ppm. Connate water in the oil-bearing formation may have a multivalent ion content of at least 200 ppm, or at least 250 ppm, or at least 500 ppm, and may have a multivalent ion content of from 200 ppm to 40,000 ppm, or from 250 ppm to 20,000 ppm, or from 500 ppm to 15,000 ppm. Connate water in the oil-bearing formation may have a divalent ion content of at least 150 ppm, or at least 200 ppm, or at least 250 ppm, or at least 500 ppm, of from 150 ppm to 35,000 ppm, or from 200 ppm to 20,000 ppm, or from 250 ppm to 15,000 ppm.

The water in the oil-bearing formation may be positioned to immobilize oil within the pores. Introduction of the low salinity aqueous fluid into the formation may mobilize at least a portion of the oil in the formation for production and recovery from the formation by freeing at least a portion of the oil from pores within the formation. Introduction of the low salinity aqueous fluid into the formation may make at least a portion of the surface of the formation more water-wet and less oil-wet relative to the surface of the formation prior to introduction of the low salinity aqueous fluid into the formation and contact of the low salinity aqueous fluid with the formation, which may mobilize the oil for production from the formation.

The oil-bearing formation 103 should be a formation susceptible to production of oil by injection of an aqueous fluid comprising low salinity water into the formation and subsequent production and recovery of oil from the formation. Oil-bearing formations susceptible to production of oil by low salinity water-flood enhanced oil recovery processes may be oil-wet or mixed-wet but not water-wet, where a substantial portion of the surface of the pores in the formation is wetted with oil rather than water in an oil-wet or mixed-wet formation. Preferably, the formation has an Amott-Harvey wettability index of greater than −0.3, and more preferably greater than 0, or most preferably greater than 0.3, or from −0.3 to 1.0 as measured by the Amott-Harvey wettability test, and has a contact angle of less than 110°, or less than 70°, or from 0° to 110°. The formation also preferably contains a substantial amount of oil-in-place, a portion of which may be recovered by mobilization using the low salinity aqueous fluid, therefore the formation preferably has an initial water saturation ($S_{wi}$) of less than 0.3.

Determination of the suitability of a formation for the low salinity aqueous fluid enhanced oil recovery may be made by conducting conventional core flow studies on core plugs extracted from the formation, where low salinity water is utilized as the injectant and where the core plugs are saturated with oil from the formation and with connate water or water having a salinity matched to the formation connate water salinity at a comparable initial water saturation.

Figure 4:
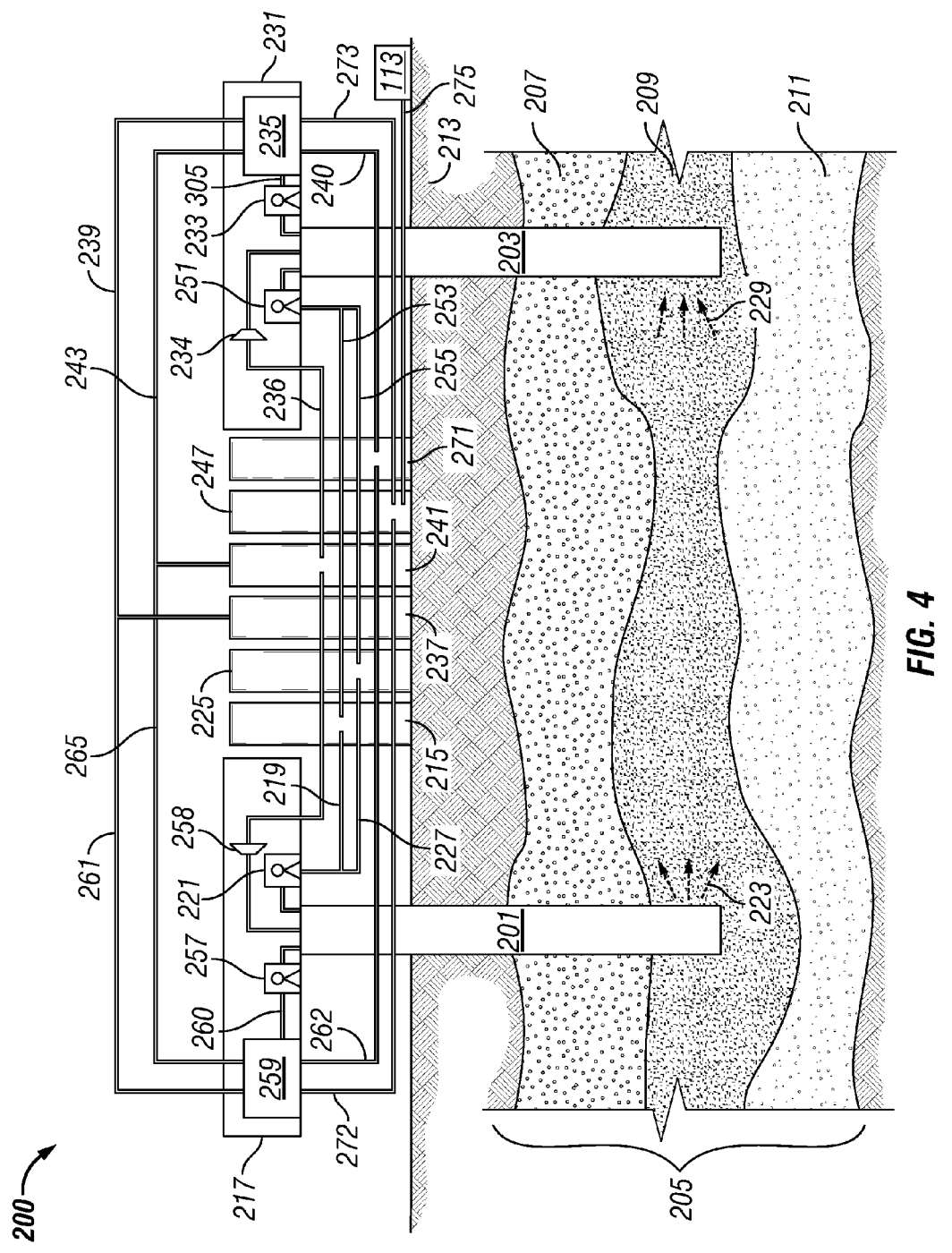

Referring now to FIG. 4, a system 200 for practicing a method of the present invention is shown. The system includes a first well 201 and a second well 203 extending into an oil-bearing formation 205 such as described above. The oil-bearing formation 205 may be comprised of one or more formation portions 207, 209, and 211 formed of porous material matrices, such as described above, located beneath an overburden 213. A low salinity aqueous fluid as described above is provided. The low salinity aqueous fluid may be provided from an aqueous fluid storage facility 215 fluidly operatively coupled to a first injection/production facility 217 via conduit 219. First injection/production facility 217 may be fluidly operatively coupled to the first well 201, which may be located extending from the first injection/production facility 217 into the oil-bearing formation 205. The low salinity aqueous fluid may flow from the first injection/production facility 217 through the first well to be introduced into the formation 205, for example in formation portion 209, where the first injection/production facility 217 and the first well, or the first well itself, include(s) a mechanism for introducing the low salinity aqueous fluid into the formation. Alternatively, the low salinity aqueous fluid may flow from the aqueous fluid storage facility 215 directly to the first well 201 for injection into the formation 205, where the first well comprises a mechanism for introducing the low salinity aqueous fluid into the formation. The mechanism for introducing the low salinity aqueous fluid into the formation 205 via the first well 201—located in the first injection/production facility 217, the first well 201, or both—may be comprised of a pump 221 for delivering the low salinity aqueous fluid to perforations or openings in the first well through which the low salinity aqueous fluid may be introduced into the formation.

The low salinity aqueous fluid may be introduced into the formation 205, for example by injecting the low salinity aqueous fluid into the formation through the first well 201 by pumping the low salinity aqueous fluid through the first well and into the formation. The pressure at which the low salinity aqueous fluid is introduced into the formation may range from the instantaneous pressure in the formation up to the fracture pressure of the formation or exceeding the fracture pressure of the formation. The pressure at which the low salinity aqueous fluid may be injected into the formation may range from 20% to 95%, or from 40% to 90%, of the fracture pressure of the formation. Alternatively, the low salinity aqueous fluid may be injected into the formation at a pressure of at least the fracture pressure of the formation, where the low salinity aqueous fluid is injected under formation fracturing conditions.

The volume of the low salinity aqueous fluid introduced into the formation 205 via the first well 201 may range from 0.001 to 5 pore volumes, or from 0.01 to 2 pore volumes, or from 0.1 to 1 pore volumes, or from 0.2 to 0.9 pore volumes, where the term "pore volume" refers to the volume of the formation that may be swept by the low salinity aqueous fluid between the first well 201 and the second well 203. The pore volume may be readily be determined by methods known to a person skilled in the art, for example by modeling studies or by injecting water having a tracer contained therein through the formation 205 from the first well 201 to the second well 203.

As the low salinity aqueous fluid is introduced into the formation 205, the low salinity aqueous fluid spreads into the formation as shown by arrows 223. Upon introduction to the formation 205, the low salinity aqueous fluid contacts the surface of the porous matrix material of the formation, and may change the surface to be more water-wet and less oil-wet. Introduction of the low salinity aqueous fluid to the formation may mobilize oil in the formation for production from the formation. The low salinity aqueous fluid may mobilize the oil in the formation, for example, by reducing the capillary forces retaining the petroleum in pores in the formation, by reducing the wettability of the petroleum on pore surfaces in the formation, and/or by reducing the interfacial tension between petroleum and water in the pores in the formation.

The mobilized oil and the low salinity aqueous fluid may be pushed across the formation 205 from the first well 201 to the second well 203 by further introduction of more low salinity aqueous fluid or by introduction of an oil immiscible formulation into the formation subsequent to introduction of the low salinity aqueous fluid into the formation. The oil immiscible formulation may be introduced into the formation 205 through the first well 201 after completion of introduction of the low salinity aqueous fluid into the formation to force or otherwise displace the oil and the low salinity aqueous fluid toward the second well 203 for production.

The oil immiscible formulation may be configured to displace the oil as well as the low salinity aqueous fluid through the formation 205. Suitable oil immiscible formulations are not first contact miscible or multiple contact miscible with oil in the formation 205. The oil immiscible formulation may be selected from the group consisting of an aqueous polymer fluid, water in gas or liquid form, carbon dioxide at a pressure below its minimum miscibility pressure, nitrogen at a pressure below its minimum miscibility pressure, air, and mixtures of two or more of the preceding.

Suitable polymers for use in an aqueous polymer fluid may include, but are not limited to, polyacrylamides, partially hydrolyzed polyacrylamides, polyacrylates, ethylenic copolymers, biopolymers, carboxymethylcellulose, polyvinyl alcohols, polystyrene sulfonates, polyvinylpyrrolidones, AMPS (2-acrylamide-2-methyl propane sulfonate), combinations thereof, or the like. Examples of ethylenic copolymers include copolymers of acrylic acid and acrylamide, acrylic acid and lauryl acrylate, lauryl acrylate and acrylamide. Examples of biopolymers include xanthan gum, and guar gum. In some embodiments, polymers may be cross-linked in situ in the formation 205. In other embodiments, polymers may be generated in situ in the formation 205.

The oil immiscible formulation may be stored in, and provided for introduction into the formation 205 from, an oil immiscible formulation storage facility 225 that may be fluidly operatively coupled to the first injection/production facility 217 via conduit 227. The first injection/production facility 217 may be fluidly operatively coupled to the first well 201 to provide the oil immiscible formulation to the first well for introduction into the formation 205. Alternatively, the oil immiscible formulation storage facility 225 may be fluidly operatively coupled to the first well 201 directly to provide the oil immiscible formulation to the first well for introduction into the formation 205. The first injection/production facility 217 and the first well 201, or the first well itself, may comprise a mechanism for introducing the oil immiscible formulation into the formation 205 via the first well 201. The mechanism for introducing the oil immiscible formulation into the formation 205 via the first well 201 may be comprised of a pump or a compressor for delivering the oil immiscible formulation to perforations or openings in the first well through which the oil immiscible formulation may be injected into the formation. The mechanism for introducing the oil immiscible formulation into the formation 205 via the first well 201 may be the pump 221 utilized to inject the low salinity aqueous fluid into the formation via the first well 201.

The oil immiscible formulation may be introduced into the formation 205, for example, by injecting the oil immiscible formulation into the formation through the first well 201 by pumping the oil immiscible formulation through the first well and into the formation. The pressure at which the oil immiscible formulation may be injected into the formation 205 through the first well 201 may be up to or exceeding the fracture pressure of the formation, or from 20% to 99%, or from 30% to 95%, or from 40% to 90% of the fracture pressure of the formation, or greater than the fracture pressure of the formation.

The amount of oil immiscible formulation introduced into the formation 205 via the first well 201 following introduction of the oil recovery formulation into the formation through the first well may range from 0.001 to 5 pore volumes, or from 0.01 to 2 pore volumes, or from 0.1 to 1 pore volumes, or from 0.2 to 0.6 pore volumes, where the term "pore volume" refers to the volume of the formation that may be swept by the oil immiscible formulation between the first well and the second well. The amount of oil immiscible formulation introduced into the formation 205 should be sufficient to drive the mobilized oil and the low salinity aqueous fluid across at least a portion of the formation. If the oil immiscible formulation is in gaseous phase, the volume of oil immiscible formulation introduced into the formation 205 following introduction of the low salinity aqueous fluid into the formation relative to the volume of low salinity aqueous fluid introduced into the formation immediately preceding introduction of the oil immiscible formulation may be at least 10 or at least 20, or at least 50 volumes of gaseous phase oil immiscible formulation per volume of low salinity aqueous fluid introduced into the formation immediately preceding introduction of the gaseous phase oil immiscible formulation.

If the oil immiscible formulation is in liquid phase, the oil immiscible formulation may have a viscosity of at least the same magnitude as the viscosity of the mobilized oil at formation temperature conditions to enable the oil immiscible formulation to drive the mobilized oil across the formation 205 to the second well 203. The oil immiscible formulation may have a viscosity of at least 0.8 mPa·s (0.8 cP) or at least 10 mPa·s (10 cP), or at least 50 mPa·s (50 cP), or at least 100 mPa·s (100 cP), or at least 500 mPa·s (500 cP), or at least 1,000 mPa·s (1000 cP), or at least 10,000 mPa·s (10,000 cP) at formation temperature conditions or at 25° C. If the oil immiscible formulation is in liquid phase, preferably the oil immiscible formulation may have a viscosity at least one order of magnitude greater than the viscosity of the mobilized oil at formation temperature conditions so the oil immiscible formulation may drive the mobilized oil across the formation in plug flow, minimizing and inhibiting fingering of the mobilized oil through the driving plug of oil immiscible formulation.

The low salinity aqueous fluid and the oil immiscible formulation may be introduced into the formation through the first well 201 in alternating slugs. For example, the low salinity aqueous fluid may be introduced into the formation 205 through the first well 201 for a first time period, after which the oil immiscible formulation may be introduced into the formation through the first well for a second time period subsequent to the first time period, after which the low salinity aqueous fluid may be introduced into the formation through the first well for a third time period subsequent to the second time period, after which the oil immiscible formulation may be introduced into the formation through the first well for a fourth time period subsequent to the third time period. As many alternating slugs of the low salinity aqueous fluid and the oil immiscible formulation may be introduced into the formation through the first well as desired.

Oil may be mobilized for production from the formation 205 via the second well 203 by introduction of the low salinity aqueous fluid and, optionally, the oil immiscible formulation into the formation through the first well 201, where the mobilized oil is driven through the formation from the first well 201 for production from the second well 203 as indicated by arrows 229. At least a portion of the low salinity aqueous fluid may pass through the formation 205 from the first well 201 to the second well 203 for production from the formation along with the mobilized oil. Water other than the low salinity aqueous fluid and/or gas may also be mobilized for production from the formation 205 via the second well 203 by introduction of the low salinity aqueous fluid and, optionally, the oil immiscible formulation into the formation via the first well 201.

After introduction of the low salinity aqueous fluid and, optionally, the oil immiscible formulation into the formation 205 via the first well 201, oil may be recovered and produced from the formation via the second well 203. A mechanism may be located at the second well for recovering and producing oil from the formation 205 subsequent to introduction of the low salinity aqueous fluid into the formation. The mechanism for recovering and producing oil from the formation may also recover and produce at least a portion of the low salinity aqueous fluid, other water, and/or gas from the formation subsequent to introduction of the low salinity aqueous fluid into the formation. The mechanism located at the second well 203 for recovering and producing the oil, the low salinity aqueous fluid, other water, and/or gas may be comprised of a pump 233, which may be located in a second injection/production facility 231 and/or within the second well 203. The pump 233 may draw the oil, at least a portion of the low salinity aqueous fluid, other water, and/or gas from the formation 205 through perforations in the second well 203 to deliver the oil, at least a portion of the low salinity aqueous fluid, other water, and/or gas, to the second injection/production facility 231.

Alternatively, the mechanism for recovering and producing the oil, at least a portion of the low salinity aqueous fluid, other water, and/or gas from the formation 205 may be comprised of a compressor 234 that may be located in the second injection/production facility 231. The compressor 234 may be fluidly operatively coupled to a gas storage tank 241 via conduit 236, and may compress gas from the gas storage tank for injection into the formation 205 through the second well 203. The compressor may compress the gas to a pressure sufficient to drive production of oil, the low salinity aqueous fluid, other water, and/or gas from the formation via the second well 203, where the appropriate pressure may be determined by conventional methods known to those skilled in the art. The compressed gas may be injected into the formation from a different position on the second well 203 than the well position at which the oil, low salinity aqueous fluid, other water, and/or gas are produced from the formation, for example, the compressed gas may be injected into the formation at formation portion 211 while oil, low salinity aqueous fluid, other water, and/or gas are produced from the formation at formation portion 209.

Oil, at least a portion of the low salinity aqueous fluid, other water, and/or gas may be drawn from the formation 205 as shown by arrows 229 and produced up the second well 203 to the second injection/production facility 231. The oil may be separated from gas and an aqueous mixture comprised of the produced portion of low salinity aqueous fluid and other formation water produced from the formation, for example connate water, mobile water, or water from a oil recovery water flood. The produced oil may be separated from the produced aqueous mixture and produced gas in a separation unit 235 located in the second injection/production facility 231 and, in an embodiment, operatively fluidly coupled to the mechanism 233 for recovering and producing oil, the components of the aqueous mixture, and/or gas from the formation.

A brine solution having a TDS content of greater than 10,000 ppm, or from 15,000 ppm to 250,000 ppm may be provided from a brine solution storage facility 247 to the separation unit 235 via conduit 273 for mixing with the produced oil and the produced aqueous mixture, and optionally with produced gas. The brine solution may have a TDS content of at least 15,000 ppm, or at least 20,000 ppm, or at least 25,000 ppm, or at least 30,000 ppm, or at least 40,000 ppm, or at least 50,000 ppm, or from greater than 10,000 ppm to 250,000 ppm, or from 15,000 ppm to 200,000 ppm, or from 20,000 ppm to 150,000 ppm, or from 30,000 ppm to 100,000 ppm. The brine solution may be selected from seawater, brackish water, or production water produced from the formation and separated from oil and/or gas produced from the formation. Alternatively, the brine solution may be comprised of at least a portion of a retentate 117, a primary retentate 125 and/or a secondary retentate 127, or a first retentate 137 and/or a second retentate 143 (as shown in FIGS. 1-3) produced by contact of a saline source water with an ionic filter as described above. An ionic filter 113 as described above may be fluidly operatively connected to the brine solution storage facility 247 via conduit 275 to provide the retentate 117, 125, 127, 137, and/or 143 as at least a portion of the brine solution to the brine solution storage facility 247.

A demulsifier may also be provided to the separation facility 235 from a demulsifier storage facility 271 which may be fluidly operatively connected to the separation unit via conduit 240. The demulsifier may be provided to the separation facility 235 for mixing with the produced oil, the produced water, and the brine solution, and optionally with produced gas, to facilitate separation of the produced oil and the produced water.

The demulsifier may be selected from the group consisting of amylresins; butylresins; nonylresins; acid- or base-catalyzed phenol-formaldehyde resins; phenol-acrylate anhydride polyglycol resins; urethanes; polyamines; polyesteramines; sulfonates; di-epoxides; polyols; esters and polyol esters including triol fatty acid esters, triol adipate esters, and triol fumarate esters; ethoxylated and/or propoxylated compounds of amyl resins, butylresins, nonylresins, acid- or base-catalyzed phenol-formaldehyde resins, fatty acids, polyamines, di-epoxides, and polyols; and combinations thereof which may be dispersed in a carrier solvent selected from the group consisting of xylene, toluene, heavy aromatic naphtha, isopropanol, methanol, 2-ethoxyhexanol, diesel, and combinations thereof. A suitable demulsifier for separating the oil and water produced from the formation 205 may be selected by conducting a bottle test, a conventional test known to those skilled in the art for selecting a demulsifier effective to separate crude oil and water. Commercially available demulsifiers include the EB-Series from National Chemical Supply, 4151 SW 47$^{th}$ Ave., Davie, Fla., 33314, United States, and Tretolite demulsifiers from Baker Petrolite Corporation, 12645 W. Airport Blvd., Sugar Land, Tex. 77478, United States.

Figure 5:
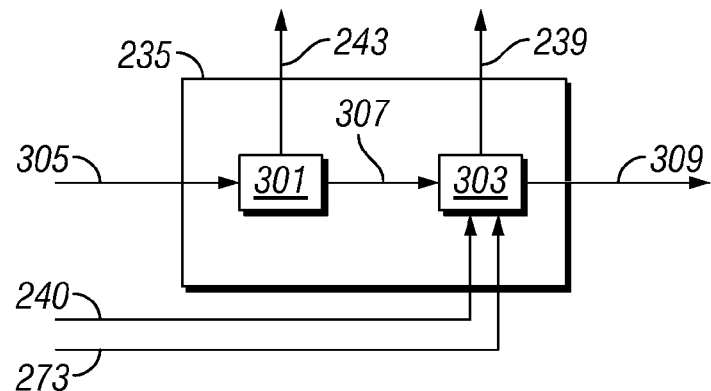
FIG. 5 is a diagram of an oil and water separation unit that may be used in the process of the present invention.

Referring now to FIG. 5, a separation unit 235 that may be utilized in the method of the present invention is shown. The separation unit 235 may be comprised of a 2-phase separator 301 and a water knockout vessel 303. The 2-phase separator may be a conventional 2-phase separator for separating a gas phase from a liquid phase, where the 2-phase separator may be a vertical, horizontal, or spherical separator, and may be a high pressure separator (5.2 MPa-34.4 MPa; 750-5000 psi), a medium pressure separator (1.6 MPa-5.2 MPa; 230-750 psi), or a low pressure separator (0.07 MPa-1.6 MPa; 10-230 psi). Produced oil, produced water, and produced gas 305 may be provided from the second well to the 2-phase separator 301. Gas may be separated from the produced oil and produced water in the 2-phase separator 301 by phase separation, and the separated gas may be removed from the 2-phase separator by conduit 243. As shown in FIG. 4, the separated gas may be provided from the separator 235 to a gas storage facility 241 which may be fluidly operatively connected to the separator by conduit 243. Referring back to FIG. 5, produced oil and produced water may be separated from the gas in the 2-phase separator 301 by phase separation, and the separated produced oil and produced water mixture may be provided from the 2-phase separator to the water knockout vessel 303, which may be fluidly operatively connected to the 2-phase separator by conduit 307.

The produced oil and the produced water may be separated in the water knockout vessel 303 by density separation and demulsification with the brine solution and the demulsifier. The water knockout vessel 303 may be a conventional water knockout vessel. As described above, the brine solution may be provided from a brine solution storage facility 247 (FIG. 4) to the separation unit 235 by conduit 273, where the brine solution may be provided to the water knockout vessel 303 of the separation unit. Also, as described above, the demulsifier may be provided from a demulsifier storage facility 271 (FIG. 4) to the separation unit 235 by conduit 240, where the demulsifier may be provided to the water knockout vessel 303 of the separation unit. If desired or necessary, additional emulsion-breaking steps may be conducted in the water knockout vessel 303 after forming the mixture of the brine solution, oil, and water to further destabilize the emulsion and separate oil from water. For example, the mixture of brine solution, oil, and water may be heated to destabilize the emulsion, or the mixture may be electrostatically dehydrated.

The demulsifier and the brine solution may be provided to the water knockout vessel 303 in sufficient quantities to facilitate rapid demulsification of any oil-in-water or water-in-oil emulsions present in the water knockout vessel to promote rapid clean separation of the oil and water in the water knockout vessel. The brine solution may be provided to the water knockout vessel 303 in an amount sufficient to increase the TDS content of the produced water to greater than that of the aqueous phase produced from production well 203, to at least 5,000 ppm, or at least 10,000 ppm, or at least 15,000 ppm, or at least 20,000 ppm, or at least 25,000 ppm, or at least 30,000 ppm, or from greater than 10,000 ppm to 100,000 ppm, or from 15,000 ppm to 50,000 ppm, or from 20,000 ppm to 40,000 ppm, or from 50,000 ppm to 250,000 ppm. Alternatively, the brine solution may be added to the produced oil and produced water mixture in the water knockout vessel 303 such that the brine solution is from 2 vol. % to 40 vol. % of the produced oil and produced water mixture, or from 5 vol. % to 33 vol. % of the produced oil and produced water mixture, or from 10 vol. % to 25 vol. % of the produced oil and produced water mixture. The demulsifier may be added to the produced oil, produced water and brine solution mixture such that the demulsifier is present in an amount of from 2 ppm to 200 ppm, or from 10 ppm to 100 ppm. Alternatively, a demulsifier solution may be added to the produced oil, produced water, and brine solution mixture such that the demulsifier solution is from 0.05 vol. % to 5 vol. %, or from 0.1 vol. % to 2 vol. % of the mixture of the produced oil, produced water, and brine solution, where the demulsifier solution may contain from 0.1 wt. % to 5 wt. %, or from 0.5 wt. % to 2.5 wt. %, or from 1 wt. % to 2 wt. % of the demulsifier compound(s).

Inclusion of the brine solution with a mixture of produced oil, produced water, and demulsifier may significantly decrease the time required for an emulsion of oil and water to separate into distinct phases of oil and water relative to the time required for a mixture of the produced oil, produced water, and demulsifier without the brine solution to separate into distinct phases. Inclusion of the brine solution with a mixture of produced oil, produced water, and demulsifier may decrease the time required to separate an emulsion of oil and water into distinct phases by at least 2 times, or at least 3 times, or at least 4 times, or at least 5 times, or at least 10 times relative to the same mixture without the brine solution. Consequently, the volume of the water knockout vessel may be at least 2 times, or at least 3 times, or at least 4 times, or at least 5 times less when utilizing the brine solution relative to the volume of a water knockout vessel required to separate and demulsify produced oil, produced water, and a demulsifier without the brine solution.

Produced oil may be separated from the water knockout vessel 303, and, as shown in FIG. 4, provided from the separation unit 235 to an oil storage tank 237. The water knockout vessel 303 (FIG. 5) of the separation unit 235 may be fluidly operatively connected to the oil storage tank 237 by conduit 239 for provision of the separated produced oil from the water knockout vessel 303 to the oil storage tank 237.

Produced water may be separated from the water knockout vessel via conduit 309. The produced water may be provided to an ionic filter as described above to produce a treated water and a brine solution. The treated water may be provided to the aqueous fluid storage facility 215 for re-introduction into the formation as described above. The brine solution may be provided to the brine solution storage facility 247 for use to demulsify further produced oil and produced water.

Figure 6:
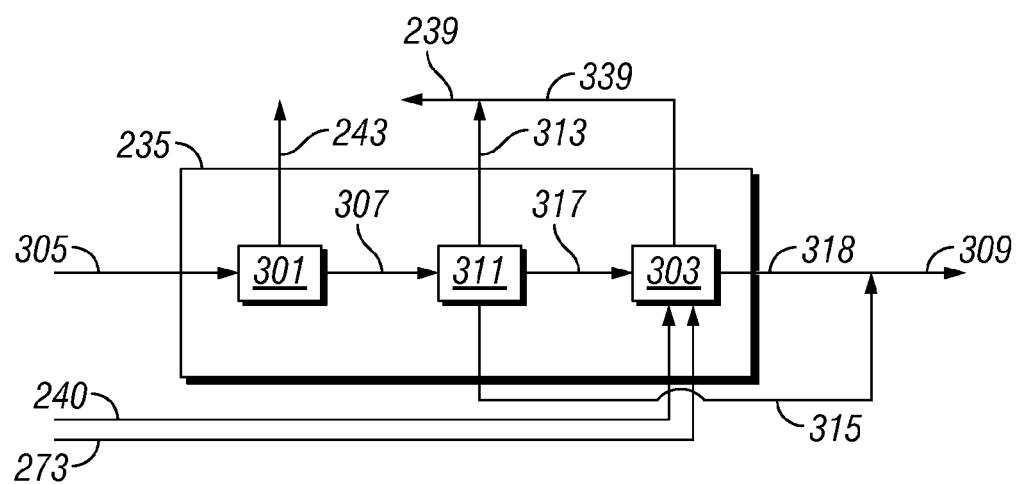
FIG. 6 is a diagram of an oil and water separation unit that may be used in the process of the present invention.

As shown in FIG. 6, the separation unit 235 may be additionally comprised of a free water knockout vessel 311 in addition to the 2-phase separator 301 and the water knockout vessel 303. The free water knockout vessel 311 may be a conventional free water knockout vessel. Gas 243 may be separated from produced oil and produced water in the 2-phase separator as described above, and the produced oil and produced water may be provided to the free water knockout vessel 311. Oil 313 and water 315 that are already phase-separated may be separated and removed from the free water knockout vessel 311. Oil and water that are present in an emulsion 317 may be passed from the free water knockout vessel 311 to the water knockout vessel 303. Brine solution 273 and demulsifier 240 may be mixed with the emulsion in the water knockout vessel 303 to phase separate the oil and water in the emulsion. If desired or necessary, additional emulsion-breaking steps may be conducted in the water knockout vessel 303 after forming the mixture of the brine solution, demulsifier, oil, and water to further destabilize the emulsion and separate oil from water. For example, the mixture of brine solution, demulsifier, oil, and water may be heated to destabilize the emulsion, or the mixture may be electrostatically dehydrated. The oil 339 separated from the emulsion may be separated from the water knockout vessel 303 and combined with the oil 313 separated from the free water knockout vessel 311 and provided for storage in the oil storage tank 237 via conduit 239 (FIG. 4). The water 318 separated from the emulsion in the water knockout vessel 303 may be combined with water 315 separated from the free water knockout vessel 311. The combined water 309 may be provided to an ionic filter as described above for separation into a low salinity treated water and a brine solution. The low salinity treated water may be provided from the ionic filter to the aqueous fluid storage facility 215 for re-introduction into the formation as described above. The brine solution may be provided from the ionic filter to the brine solution storage facility 247 for use to demulsify further produced oil and produced water.

Figure 7:
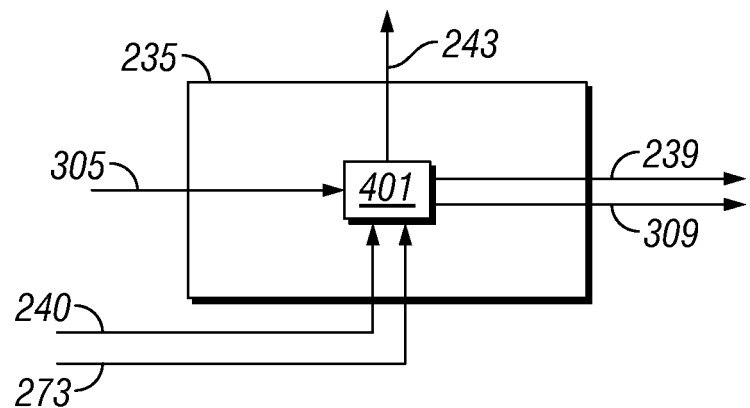
FIG. 7 is a diagram of an oil and water separation unit that may be used in the process of the present invention.

Alternatively, as shown in FIG. 7, the separation unit 235 may be comprised of a 3-phase separator 401. The 3-phase separator 401 may be a conventional 3-phase separator for separating gas, oil and water. Produced oil, produced water, and produced gas 305 may be provided from the producing well to the 3-phase separator 401. Gas, oil, and water may be separated by phase separation in the 3-phase separator 401. The separated gas may be removed from the 3-phase separator by conduit 243. As shown in FIG. 4, the separated gas may be provided from the separator 235 to a gas storage facility 241 which is fluidly operatively connected to the separator by conduit 243. Referring back to FIG. 7, the brine solution 273 and the demulsifier 240 may be provided to the 3-phase separator to demulsify an oil and water emulsion present in the 3-phase separator and produce a liquid oil phase and a liquid water phase. If desired or necessary, additional emulsion-breaking steps may be conducted in the 3-phase separator after forming the mixture of the brine solution, demulsifier, oil, and water to further destabilize the emulsion and separate oil from water. For example, the mixture of brine solution, demulsifier, oil, and water may be heated to destabilize the emulsion, or the mixture may be electrostatically dehydrated. The liquid oil phase may be separated from the 3-phase separator via conduit 239 which may be fluidly operatively connected to the oil storage tank 237 (FIG. 4). The liquid water phase may be separated from the 3-phase separator by conduit 309, which may be fluidly operatively connected to an ionic filter as described above for separation into a low salinity treated water and a brine solution. The low salinity treated water may be provided from the ionic filter to the aqueous fluid storage facility 215 (FIG. 4) for re-introduction into the formation. The brine solution may be provided to the brine solution storage facility 247 for use to demulsify further produced oil and produced water.

Figure 8:
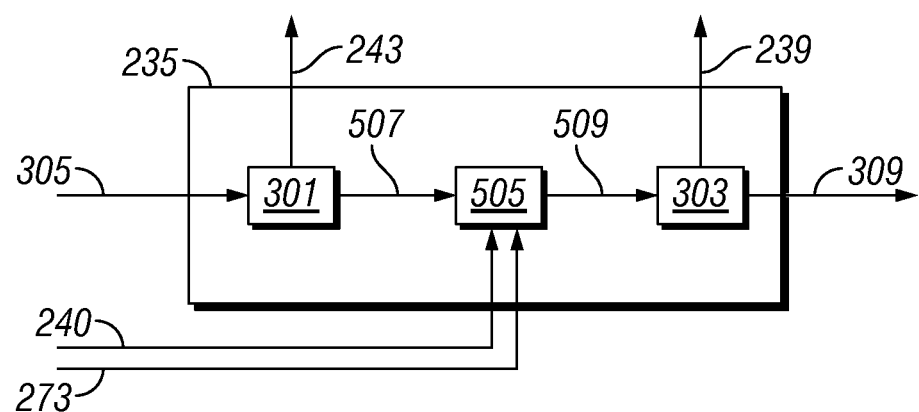
FIG. 8 is a diagram of an oil and water separation unit that may be used in the process of the present invention.

Alternatively, as shown in FIG. 8, the separation unit 235 may be comprised of a 2-phase separator 301, a mixing tank 505, and a water-knockout vessel 303, where the 2-phase separator 301 is a mechanism for separating gas from the produced oil and the produced water, the mixing tank 505 is a mechanism for contacting the brine solution and the demulsifier with the produced oil and the produced water, and the water-knockout vessel 303 is a mechanism for separating the produced oil from the produced water. The produced oil, produced water, and gas may be provided to the separation unit 235 from the second well via conduit 305, where the produced oil, produced water, and gas may be provided to the 2-phase separator 301. The 2-phase separator 301 may separate gas from the produced oil and the produced water as described above. The produced oil and the produced water may be provided from the 2-phase separator 301 to the mixing tank 505 via conduit 507. The mixing tank 505 may be any conventional mechanism for mixing liquids, for example, a mechanically stirred mixing tank. The brine solution may be provided to the mixing tank 505 from a brine solution storage facility 247 (FIG. 4) by conduit 273, and the demulsifier may be provided from a demulsifier storage facility 271 (FIG. 4) to the mixing tank by conduit 240. The brine solution, demulsifier, produced oil, and produced water may be mixed in the mixing tank 505, and then provided from the mixing tank to the water-knockout vessel 303 via conduit 509. The produced oil may be separated from the produced water in the water-knockout vessel 303 as described above, where the separated produced oil 239 may be provided to the oil storage tank 237, and the produced water 309 may be provided to an ionic filter, as described above.

Referring again to FIG. 4, in an embodiment of a method of the present invention the first well 201 may be used for injecting the low salinity aqueous fluid and, optionally, the oil immiscible formulation into the formation 205 and the second well 203 may be used to produce and separate oil, water, and optionally gas from the formation as described above for a first time period, and the second well 203 may be used for injecting the low salinity aqueous fluid and, optionally, the oil immiscible formulation into the formation 205 to mobilize the oil in the formation and drive the mobilized oil across the formation to the first well and the first well 201 may be used to produce and separate oil, water, and gas from the formation for a second time period, where the second time period is subsequent to the first time period. The second injection/production facility 231 may comprise a mechanism such as pump 251 that is fluidly operatively coupled the aqueous fluid storage facility 215 by conduit 253 and that is fluidly operatively coupled to the second well 203 to introduce the low salinity aqueous fluid into the formation 205 via the second well. The pump 251 or a compressor may also be fluidly operatively coupled to the oil immiscible formulation storage facility 225 by conduit 255 to introduce the oil immiscible formulation into the formation 205 via the second well 203 subsequent to introduction of the low salinity aqueous fluid into the formation via the second well. The first injection/production facility 217 may comprise a mechanism such as pump 257 or compressor 258 for production of oil, water, and gas from the formation 205 via the first well 201. The first injection/production facility 217 may also include a separation unit 259 for separating produced oil, produced water, and produced gas fluidly operatively connected to the mechanism 257 by conduit 260, where the separation unit 259 may be similar to separation unit 235 as described above. The brine solution storage facility 247 may be fluidly operatively connected to the separation unit 259 by conduit 272 to provide brine solution to the separation unit 259, and the demulsifier storage facility 271 may be fluidly operatively connected to the separation unit 259 by conduit 262 to provide demulsifier to the separation unit 259. The separation unit 259 may be fluidly operatively coupled to: the liquid storage tank 237 by conduit 261 for storage of produced and separated oil in the liquid storage tank; the gas storage tank 241 by conduit 265 for storage of produced gas in the gas storage tank; and an ionic filter for producing a low salinity treated water and a brine solution from the separated produced water.

The first well 201 may be used for introducing the low salinity aqueous fluid and, optionally, subsequently the oil immiscible formulation into the formation 205 and the second well 203 may be used for producing and separating oil, water, and gas from the formation for a first time period; then the second well 203 may be used for introducing the low salinity aqueous fluid and, optionally, subsequently the oil immiscible formulation into the formation 205 and the first well 201 may be used for producing and separating oil, water, and gas from the formation for a second time period; where the first and second time periods comprise a cycle. Multiple cycles may be conducted which include alternating the first well 201 and the second well 203 between introducing the low salinity aqueous fluid and, optionally, subsequently the oil immiscible formulation into the formation 205, and producing and separating oil, water, and gas from the formation, where one well is introducing and the other is producing and separating for the first time period, and then they are switched for a second time period. A cycle may be from about 12 hours to about 1 year, or from about 3 days to about 6 months, or from about 5 days to about 3 months. The low salinity aqueous fluid may be introduced into the formation at the beginning of a cycle and the oil immiscible formulation may be introduced at the end of the cycle. In some embodiments, the beginning of a cycle may be the first 10% to about 80% of a cycle, or the first 20% to about 60% of a cycle, the first 25% to about 40% of a cycle, and the end may be the remainder of the cycle.

Figure 9:
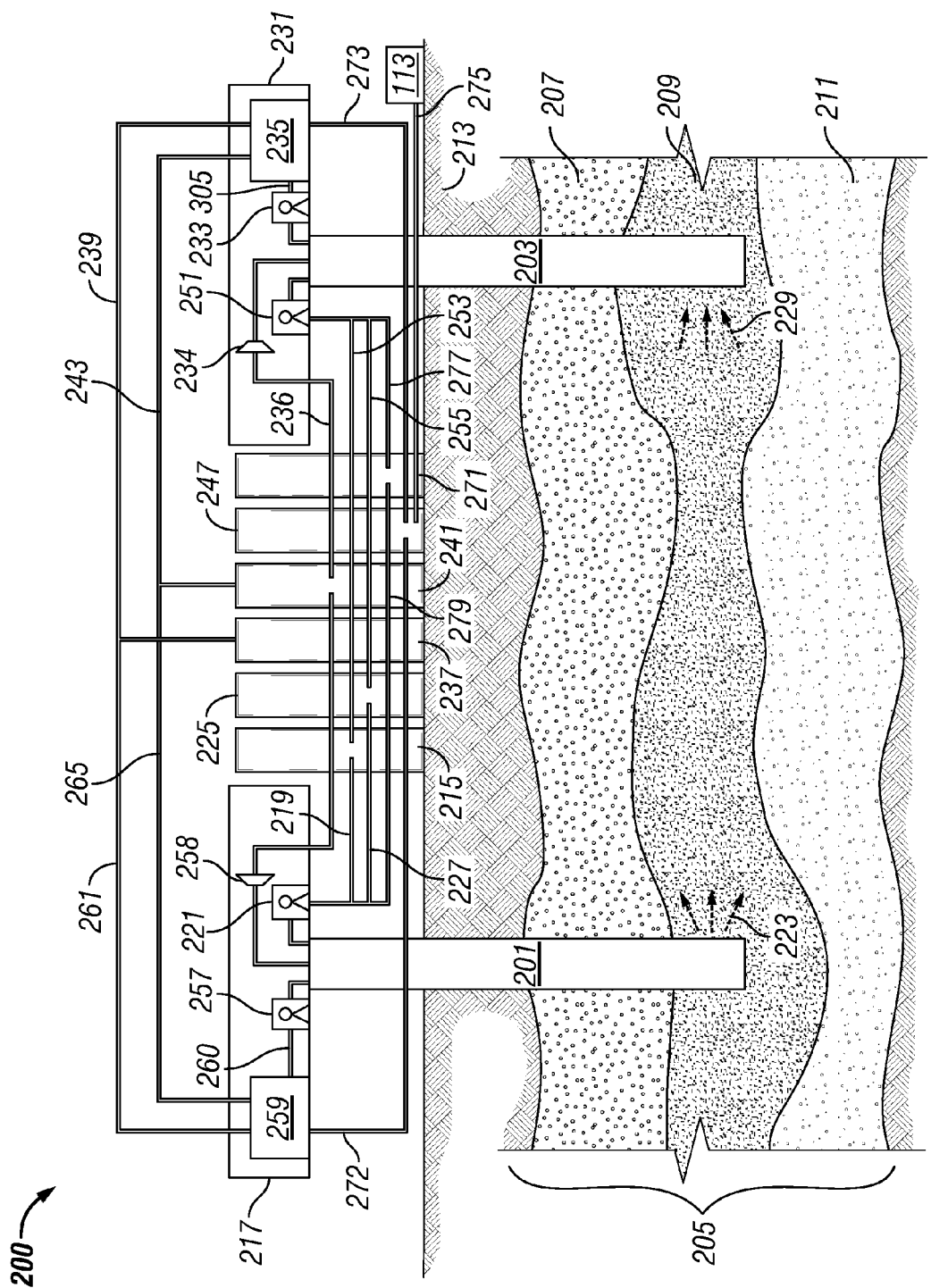
FIG. 9. is a diagram of an oil-production and separation system that may be used in the process of the present invention.

Referring now to FIG. 9, in an alternative embodiment of a process of the present invention, the demulsifier may be introduced into the production well, which may be either the first well 201 or the second well 203 as described above, and produced along with oil and water. Demulsifier need not be added to either of the separation units 235 or 259 when it is introduced into and produced from the producing well. The process of this embodiment of the invention may be as described above except that the demulsifier is introduced into the production well and may not be required to be added to either separation unit 235 or 259 to demulsify produced oil and water. When oil and water are produced from the first well 201, demulsifier may be provided from the demulsifier storage facility 271 via conduit 279 to a pumping mechanism located at the first well 201 for injection into the first well 201. Demulsifier may be injected into the first well 201 via an injection line strapped to the outside of producing or injecting tubing in the first well to be delivered immediately downstream of the wellhead, or by pumping the demulsifier into the tubing-producing casing annulus of the first well to be delivered immediately downstream of the wellhead, or by injecting the demulsifier into a production manifold within the first well. When oil and water are produced from the second well 203, demulsifier may be provided from the demulsifier storage facility 271 via conduit 277 to a pumping mechanism located at the second well 203 for injection into the second well. Demulsifier may be injected into the second well 203 via an injection line strapped to the outside of producing or injecting tubing in the second well to be delivered immediately downstream of the wellhead, or by pumping the demulsifier into the tubing-producing casing annulus of the second well to be delivered immediately downstream of the wellhead, or by injecting the demulsifier into a production manifold within the second well.

The demulsifier may be a demulsifier solution as described above containing from 0.1 wt. % to 5 wt. %, or from 0.5 wt. % to 2.5 wt. %, or from 1 wt. % to 2 wt. % of the demulsifier compound(s) as described above. The demulsifier solution may be injected into the production well in an amount sufficient to provide from 0.05 vol. % to 5 vol. %, or from 0.1 vol. % to 2 vol. % of the demulsifier solution in a mixture of demulsifier solution, oil, and water that is produced from the production well.

The produced demulsifier may be provided with the mixture of produced oil and produced water to separation unit 235 or 259 to assist in separation of the produced oil from the produced water. Brine solution may be added to the mixture of produced oil, produced water, and demulsifier in separation unit 235 or 259 to induce rapid separation of the produced oil and produced water into separate phases, as described above. If desired, additional demulsifier may be added to the mixture of produced oil, produced water, produced demulsifier, and brine solution in separation unit 235 or 259 to assist in separation of the produced oil from the produced water.

Figure 10:
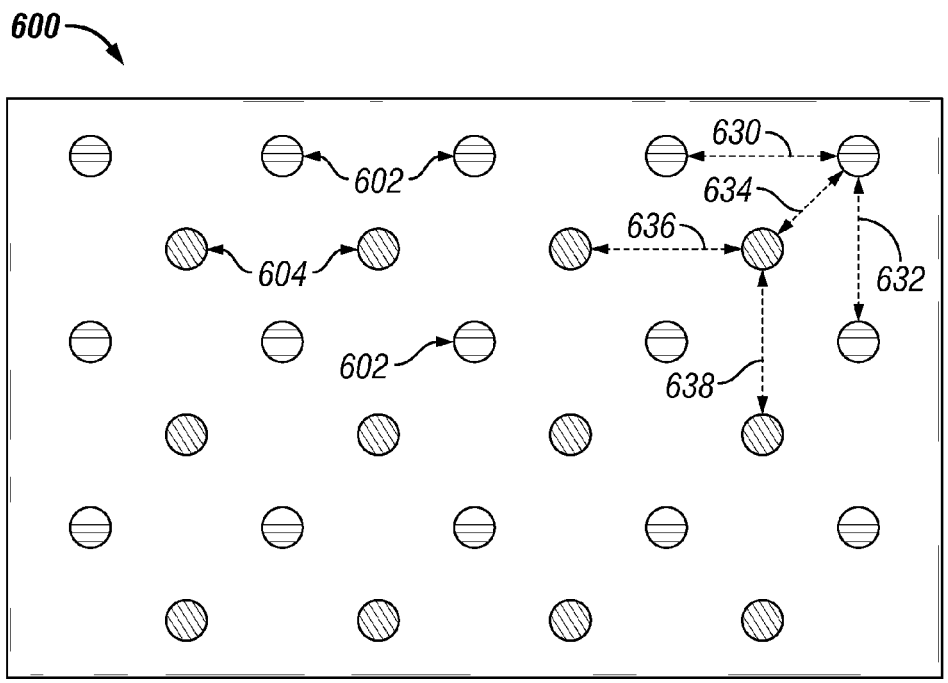
FIG. 10 is a diagram of a well pattern for production of oil than may be used in the process of the present invention.

Referring now to FIG. 10 an array of wells 600 is illustrated. Array 600 includes a first well group 602 (denoted by horizontal lines) and a second well group 604 (denoted by diagonal lines). In some embodiments of the method of the present invention, the first well of the method described above may include multiple first wells depicted as the first well group 602 in the array 600, and the second well of the method described above may include multiple second wells depicted as the second well group 604 in the array 600.

Each well in the first well group 602 may be a horizontal distance 630 from an adjacent well in the first well group 602. The horizontal distance 630 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters. Each well in the first well group 602 may be a vertical distance 632 from an adjacent well in the first well group 602. The vertical distance 632 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters.

Each well in the second well group 604 may be a horizontal distance 636 from an adjacent well in the second well group 604. The horizontal distance 636 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters. Each well in the second well group 604 may be a vertical distance 638 from an adjacent well in the second well group 604. The vertical distance 638 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters.

Each well in the first well group 602 may be a distance 634 from the adjacent wells in the second well group 604. Each well in the second well group 604 may be a distance 634 from the adjacent wells in first well group 602. The distance 634 may be from about 5 to about 5,000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters.

Each well in the first well group 602 may be surrounded by four wells in the second well group 604. Each well in the second well group 604 may be surrounded by four wells in the first well group 602.

In some embodiments, the array of wells 600 may have from about 10 to about 1,000 wells, for example from about 5 to about 500 wells in the first well group 602, and from about 5 to about 500 wells in the second well group 604.

In some embodiments, the array of wells 600 may be seen as a top view with first well group 602 and the second well group 604 being vertical wells spaced on a piece of land. In some embodiments, the array of wells 600 may be seen as a cross-sectional side view of the formation with the first well group 602 and the second well group 604 being horizontal wells spaced within the formation.

Figure 11:
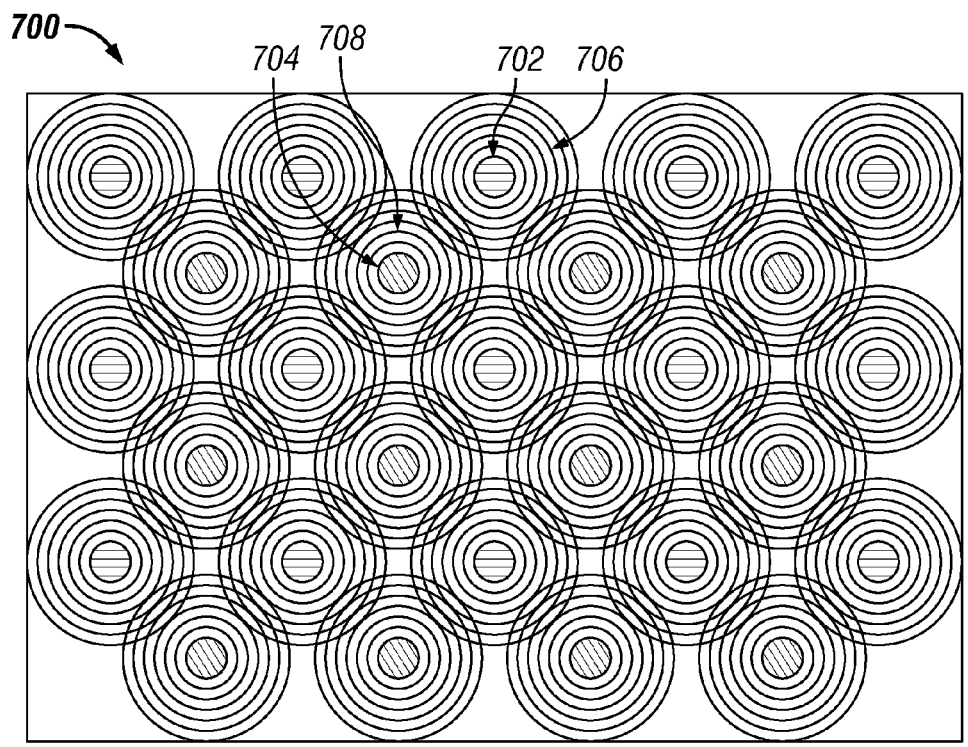
FIG. 11 is a diagram of a well pattern for production of oil that may be used in the process of the present invention.

Referring now to FIG. 11, an array of wells 700 is illustrated. Array 700 includes a first well group 702 (denoted by horizontal lines) and a second well group 704 (denoted by diagonal lines). The array 700 may be an array of wells as described above with respect to array 600 in FIG. 10. In some embodiments of the method of the present invention, the first well of the method described above may include multiple first wells depicted as the first well group 702 in the array 700, and the second well of the method described above may include multiple second wells depicted as the second well group 704 in the array 700.

The low salinity aqueous fluid and, optionally, subsequently the oil immiscible formulation may be injected into first well group 702 and oil, water, and gas may be produced and separated from the second well group 704. As illustrated, the low salinity aqueous fluid and, optionally, the oil immiscible formulation, may have an injection profile 706, and oil, water, and gas may be produced from the second well group 704 having a recovery profile 708.

The low salinity aqueous fluid and, optionally, subsequently the oil immiscible formulation, may be injected into the second well group 704 and oil, water, and gas may be produced from the first well group 702. As illustrated, the low salinity aqueous fluid and, optionally, the oil immiscible formulation may have an injection profile 708, and oil, water, and gas may be produced from the first well group 702 having a recovery profile 706.

The first well group 702 may be used for injecting the low salinity aqueous fluid and, optionally, subsequently the oil immiscible formulation, and the second well group 704 may be used for producing oil, water, and gas from the formation for a first time period; then second well group 704 may be used for injecting the low salinity aqueous fluid and, optionally, subsequently the oil immiscible formulation, and the first well group 702 may be used for producing oil, water, and gas from the formation for a second time period, where the first and second time periods comprise a cycle. In some embodiments, multiple cycles may be conducted which include alternating first and second well groups 702 and 704 between injecting the low salinity aqueous fluid and, optionally, subsequently the oil immiscible formulation, and producing oil, water, and gas from the formation, where one well group is injecting and the other is producing for a first time period, and then they are switched for a second time period.

To facilitate a better understanding of the present invention, the following example of certain aspects of some embodiments is given. In no way should the following example be read to limit, or define, the scope of the invention.

EXAMPLE

Figure 12:
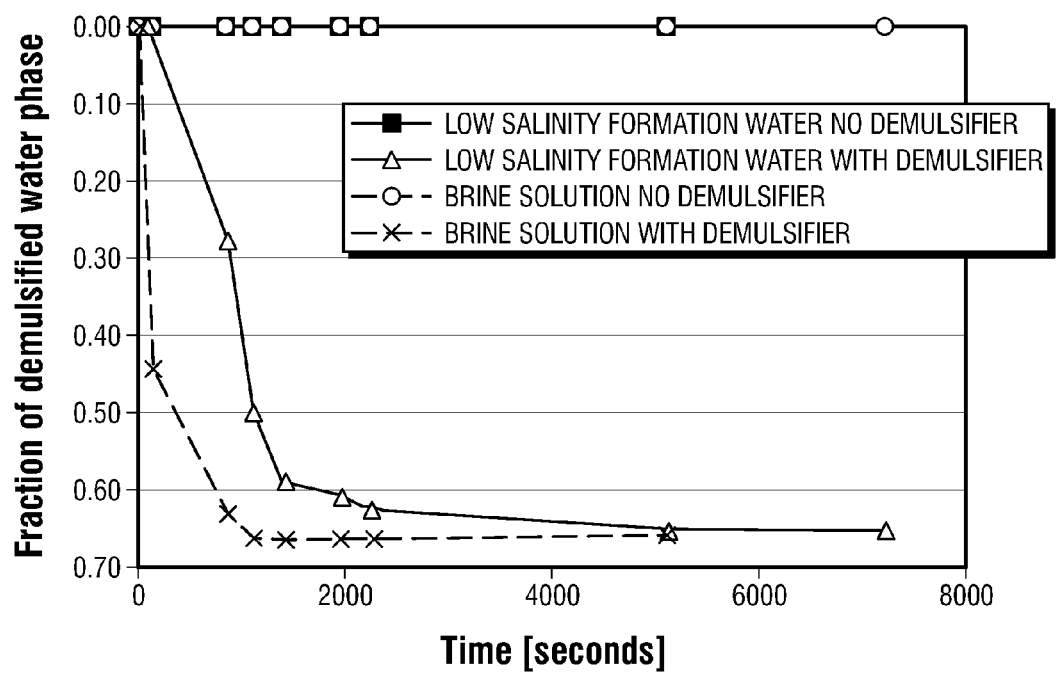
FIG. 12 is graph of a timeline for separation of oil and water.

The separation effect of a brine solution relative to low salinity water was determined. 200 ml of a light crude oil from an oil-bearing formation was emulsified with 200 ml of water from the formation, where the water had a total dissolved solids content of 6042 ppm and an ionic strength of 0.11 M. The resulting emulsion was separated into two 150 ml portions. 75 ml of the low salinity water having a TDS content of 6042 ppm and an ionic strength of 0.11 M was added to one of the emulsion portions and 75 ml of a brine solution having a TDS content of 77,479 ppm and an ionic strength of 1.54 M was added to the other emulsion portion. The emulsion portion with the low salinity water was separated into 2 samples and the emulsion portion with the brine solution was separated into 2 samples. 2 ml of a 1% solution of DROP emulsifier in toluene was added to one of the emulsion with low salinity water samples and to one of the emulsion with the brine solution samples. Each of the samples was then mixed by shaking. After shaking, each sample was monitored to determine the time required for separation of the oil phase from the water phase. The results are shown in FIG. 12. As shown in FIG. 12, the sample containing the brine solution and the demulsifier reached final phase separation approximately 5 times faster than the sample containing the low salinity formation water and the demulsifier, while the samples containing the low salinity formation water and the brine solution without demulsifier failed to separate into separate phases.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also may include any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A process for producing oil, comprising
    contacting a source water having a total dissolved solids content of at least 10,000 ppm with a first ionic filter which first ionic filter is a nanofiltration membrane, a reverse osmosis membrane or a forward osmosis membrane;
    passing a portion of the source water through the first ionic filter to form a permeate having reduced salinity relative to the source water while excluding at least a portion of the source water from passing through the first ionic filter to form a primary retentate having increased salinity relative to the source water due to passing the portion of the source water through the first ionic filter;
    passing a portion of the permeate through one or more second ionic filters wherein the one or more second ionic filters are selected from the group consisting of a nanofiltration membrane, a reverse osmosis membrane, a forward osmosis membrane and combinations thereof, to form a treated water having reduced salinity relative to the permeate while excluding at least a portion of the permeate from passing through the one or more second ionic filters to form one or more secondary retentates having increased salinity relative to the permeate due to passing the portion of the permeate through the one or more second ionic filters;
    utilizing the treated water as at least a portion of an aqueous fluid injected into the formation which aqueous fluid has an ionic strength of at most 0.15 M and a total dissolved solids content of from 200 ppm to 10,000 ppm into an oil-bearing formation;
    producing oil and water from the formation subsequent to the introduction of the aqueous fluid into the formation;
    mixing a demulsifier and a brine solution having a total dissolved solids content of greater than 10,000 ppm with at least a portion of the oil and water produced from the formation wherein at least a portion of the brine solution is primary retentate, one or more of the secondary retentates, or a combination of the primary retentate and one or more of the secondary retentates; and
    separating oil from the mixture of oil, water, demulsifier, and brine solution.

2. The process of claim 1 wherein the brine solution has a total dissolved solids content of at least 15,000 ppm, or at least 20,000 ppm, or at least 25,000 ppm, or at least 30,000 ppm, or at least 40,000 ppm, or at least 50,000 ppm.

3. The process of claim 1 wherein the brine solution is selected from seawater, brackish water, or production water produced from the formation.

4. The process of claim 1 wherein from 0.2 up to 1 pore volume of the low salinity aqueous fluid is introduced into the formation.

5. The process of claim 1, further comprising the step of introducing a drive fluid into the formation subsequent to introducing the low salinity aqueous fluid into the formation.

6. The process of claim 1 wherein the oil-bearing formation further comprises connate water having a divalent ion concentration, wherein the low salinity aqueous fluid has a divalent ion concentration, and wherein the divalent ion concentration of the aqueous fluid is less than the divalent ion concentration of the connate water.

7. The process of claim 1 wherein the low salinity aqueous fluid is water from an aquifer, a lake or a river.

8. The process of claim 1 wherein the water produced from the formation comprises water that is emulsified with at least a portion of the oil produced from the formation and free water that is separable from the oil produced from the formation absent demulsification, and oil produced from the formation comprises oil that is emulsified with at least a portion of the water produced from the formation and free oil that is separable from the water produced from the formation absent demulsification, further comprising the step of separating the free water and the free oil from the emulsified oil and emulsified water prior to mixing the brine solution with the oil and water produced from the formation.

9. The process of claim 1 wherein the source water is selected from the group consisting of seawater, brackish water, water produced from the formation, water from the mixture of oil, water and brine solution subsequent to separation of oil from the mixture, and combinations thereof.

10. The process of claim 8 or 9 further comprising the step of pressurizing the source water to a pressure of from 2.0 MPa (300 psia) to 9.0 MPa (1,300 psia) prior to contacting the source water with the ionic filter.

11. The process of claim 1 wherein the source water is selected from the group consisting of seawater, brackish water, water produced from the formation, water from the mixture of oil, water, and brine solution subsequent to separation of oil from the mixture, and combinations thereof.

12. The process of claim 1 further comprising the step of pressurizing the source water to a pressure of from 2 MPa (300 psia) to 9 MPa (1,300 psia) prior to contacting the source water with the first ionic filter.

13. The process of claim 1 wherein the oil-bearing formation is a subterranean sandstone formation comprising a mineral having a negative zeta potential.

14. The process of claim 1 wherein the oil-bearing formation is a subterranean carbonate formation comprised of microcrystalline limestone, dolomite, or a mixture thereof.

* * * * *